(12) United States Patent
Mills et al.

(10) Patent No.: US 7,792,714 B1
(45) Date of Patent: Sep. 7, 2010

(54) SYSTEM AND METHOD FOR PROVIDING A COMMON DATA AND ANALYTIC FRAMEWORK FOR VALUATING FINANCIAL INSTRUMENTS AND PORTFOLIOS

(75) Inventors: Leonard O. Mills, Brookeville, MD (US); Alexander L. Shulman, Fairfax, VA (US)

(73) Assignee: Fannie Mae, Washington, DC (US)

( * ) Notice: Subject to any disclaimer, the term of this patent is extended or adjusted under 35 U.S.C. 154(b) by 1728 days.

(21) Appl. No.: 10/324,097

(22) Filed: Dec. 20, 2002

Related U.S. Application Data (60) Provisional application No. 60/342,848, filed on Dec. 28, 2001.

(51) Int. Cl.
   *G06Q 40/00* (2006.01)
(52) U.S. Cl. ........................ 705/35
(58) Field of Classification Search ............ 705/35
   See application file for complete search history.

(56) References Cited

U.S. PATENT DOCUMENTS

| | | | | |
|---|---|---|---|---|
| 5,692,233 A * | 11/1997 | Garman | .................... | 705/36 R |
| 5,774,386 A * | 6/1998 | Pawle | .................... | 708/290 |
| 5,787,269 A * | 7/1998 | Hyodo | .................... | 703/13 |
| 5,809,493 A * | 9/1998 | Ahamed et al. | .................... | 706/52 |
| 6,061,662 A * | 5/2000 | Makivic | .................... | 705/36 R |
| 6,772,136 B2 * | 8/2004 | Kant et al. | .................... | 706/50 |
| 7,109,985 B2 * | 9/2006 | Spencer et al. | .................... | 345/418 |
| 7,165,043 B2 * | 1/2007 | Keyes et al. | .................... | 705/36 R |
| 7,184,983 B2 * | 2/2007 | Corby et al. | .................... | 705/37 |
| 7,228,290 B2 * | 6/2007 | Browne et al. | .................... | 705/36 R |
| 2001/0025264 A1 * | 9/2001 | Deaddio et al. | .................... | 705/36 |
| 2002/0055897 A1 * | 5/2002 | Shidler et al. | .................... | 705/35 |
| 2002/0123951 A1 * | 9/2002 | Olsen et al. | .................... | 705/36 |
| 2003/0023525 A1 * | 1/2003 | Chen | .................... | 705/35 |
| 2003/0033229 A1 * | 2/2003 | Keyes et al. | .................... | 705/36 |
| 2003/0093351 A1 * | 5/2003 | Sarabanchong | .................... | 705/36 |
| 2003/0110112 A1 * | 6/2003 | Johnson et al. | .................... | 705/36 |

OTHER PUBLICATIONS

ABS Consulting, Mortgage Impairment Portfolio Risk Analysis, http://www.absconsulting.com/mortgageImpairment.html, pp. 1-4.*
Carrol et al.: Simplified valuation of Single-payoff Financial Instruments, 1999, Review of Quantitative Finance and Accounting, 12, pp. 383-393.*
ABS Consulting: Mortgage Impairment Portfolio Risk Analysis, 2008, pp. 1-3.*

* cited by examiner

*Primary Examiner*—Hani Kazimi
*Assistant Examiner*—Bijendra K Shrestha
(74) *Attorney, Agent, or Firm*—Rader, Fishman & Grauer PLLC (57) ABSTRACT

A distributed system that provides a common data and analytic model platform for enabling users of different applications to evaluate financial instruments. The system includes multiple user applications, and a computer network with multiple analytic servers that each includes simulation models for evaluating the financial instruments. The computer network also includes components which accept requests from the user applications, executes each request against an appropriate simulation model and returns results from the simulation model to the user application.

18 Claims, 5 Drawing Sheets

SYSTEM AND METHOD FOR PROVIDING A COMMON DATA AND ANALYTIC FRAMEWORK FOR VALUATING FINANCIAL INSTRUMENTS AND PORTFOLIOS

This application claims the benefit of U.S. Provisional Application No. 60/342,848, filed on Dec. 28, 2001, hereby incorporated by reference.

FIELD OF THE INVENTION

The present invention relates to a system and method for providing a data and analytic platform for valuing financial instruments.

BACKGROUND OF THE INVENTION

Economic parameters cause the value of the financial instruments, such as mortgages and mortgage-backed securities, to fluctuate. Therefore, financial institutions, such as banks and brokerage firms, regularly have to determine the value of financial instruments. The processing and time requirements necessary to perform these valuations are substantial. Moreover, it is important to fit a model to the underlying economic parameter so that the financial institution is able to manage the risk of its portfolio by determining the likely range of future prices and value at risk, among other variables.

Therefore, financial institutions generally apply simulation models to a financial instrument or collections of instruments. These simulation models are usually complex algorithms commonly implemented in a computer programming language. A financial institution may have multiple applications that require analytic results generated by the same simulation model or similar simulation models. Although multiple applications within the institution may use the same model, the code that provides the functionality for the simulation model is typically embedded within each application. Moreover, the model in each application is often coded with incompatible computer programming languages and/or data structures. Thus, a user of a first application often is not able to use the same model code from the first application in a second application. This approach is inefficient in that it requires that the same simulation model be coded multiple times in different applications within the same institution and does not allow for simulation model codes to be reused across the various applications.

Another approach, which results in an inflexible data framework, requires expensive external coordination and integration relationships. With this approach, financial institutions utilize an enterprise-wide integrated application solution, such as Oracle, and/or SAS running on an IBM mainframe, from an external vendor. All modeling applications in the enterprise-wide solution are coded using the same data structures. Although this approach provides a common data framework, it requires that all previously used modeling applications be standardized. This, in turn, may constrain the flexibility of the previously used data framework(s) in the financial institution.

In addition to valuing individual financial instruments, many financial institutions also are often required to rapidly assess large portfolios containing multiple financial instruments. However, many financial institutions do not employ comprehensive distributive processing techniques in their financial instrument valuation. Given the complexity of simulation models that assess large portfolios, the institution's enterprise-wide computer processing resources may be significantly drained and may result in inefficiencies in information and resource sharing. Therefore, the enterprise-wide application approach does not only reduce flexibility in the institution's data framework, it precludes optimal use of network resources when solving large complex resource intensive calculations.

SUMMARY OF THE INVENTION

The present invention relates to a distributed system that provides a common data and analytic model platform for enabling users of different applications to evaluate financial instruments. The system includes multiple user applications, and a computer network with multiple analytic servers, each of which includes simulation models for evaluating the financial instruments. The computer network also includes components that accept requests from the user applications, executes each request against an appropriate simulation model and returns results from the simulation model to the user application.

Specifically, the computer network includes at least one enterprise server, at least one computational server cluster, and at least one file server. Each enterprise server receives requests from the user application and is a high availability server responsible for splitting up requests into independent tasks. In embodiments of the invention where the computer network includes multiple enterprise servers, the computer network also includes at least one load balancer to distribute requests between the enterprise servers. Each enterprise server forwards requests from user application(s) to one or more computational server cluster that provides specialized processing capabilities for executing simulation models and includes at least one analytic server that executes the simulation models. In a preferred embodiment, each analytic server processes one task at a time and includes at least one simulation library, at least one simulation algorithm for implementing requests against the simulation library, and at least one application interface. Requests and other data used in the system are stored in the file server(s) that includes storage media for storing information, such as programming code and data.

Additional features and advantages of the invention will be set forth in the description that follows, and in part will be apparent from the description, or may be learned by practice of the invention. The objectives and advantages of the invention will be realized and attained by the system and method particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention.

In the drawings.

DESCRIPTION OF THE PREFERRED EMBODIMENTS

Reference will now be made in detail to the preferred embodiments of the present invention, examples of which are illustrated in the accompanying drawing. The present invention described below extends the functionality of the inventive system and method for providing a common analytic and data framework for valuing mortgages and mortgage portfolios.

Figure 1:
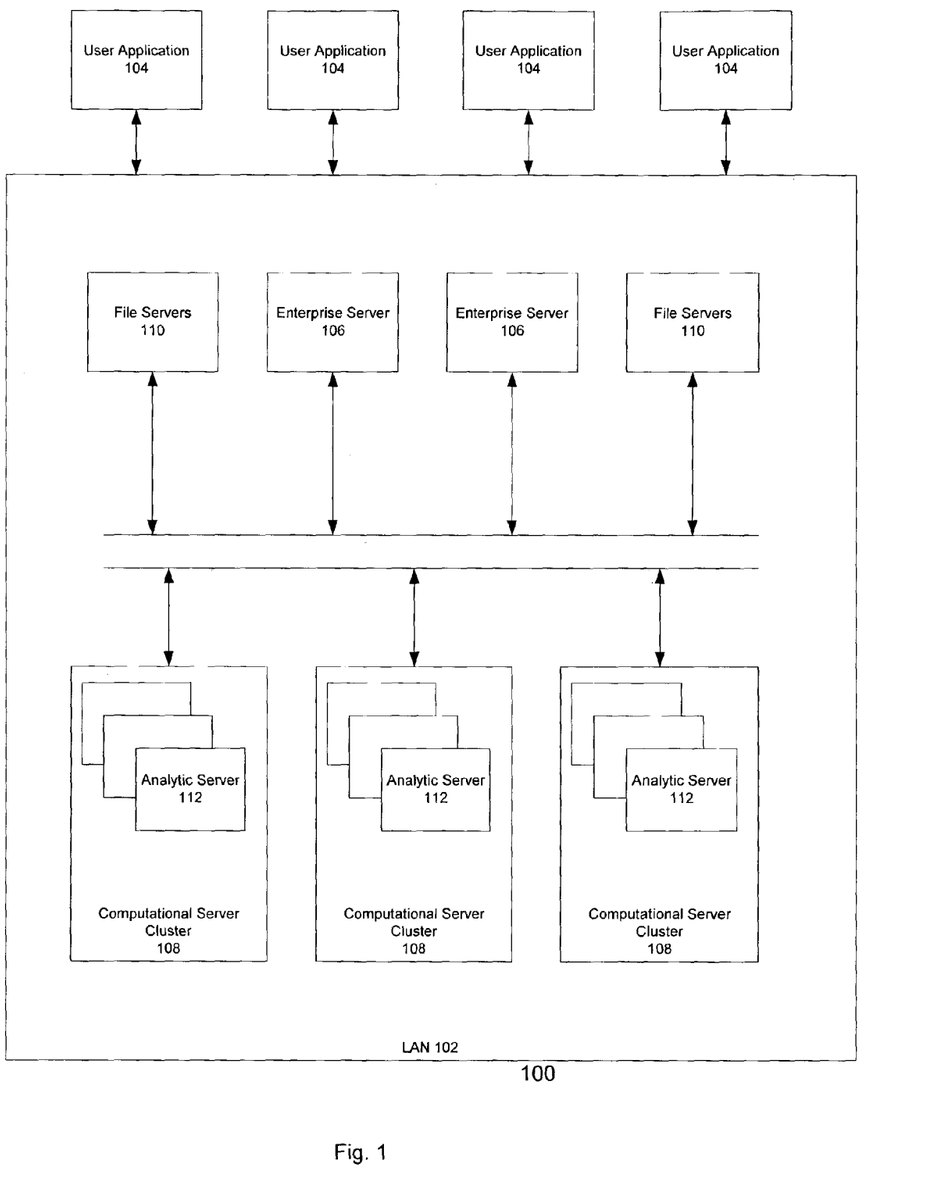
FIG. 1 illustrates an embodiment of the present inventive system that is configured to determine the value of one or more securities.

FIG. 1 illustrates system 100 that is configured to determine the value of one or more given securities. System 100 includes a local area network (LAN) 102 in communication with one or more user applications 104. LAN 102 includes at least one enterprise server 106, multiple computational server clusters 108, and multiple file servers 110. In a preferred embodiment, LAN 102 includes more than one enterprise servers 106 and one or more load balancers to distribute clients' requests between enterprise servers 106.

According to the invention, user applications 104 communicate valuation requests to enterprise server 106. Each enterprise server 106 is a high availability server that is responsible for splitting up clients' requests into independent tasks and serves as a gateway from the user application to simulation model(s) that evaluate the financial instruments. Enterprise server 106 forwards each task to one or more computational server cluster 108. Each computational server cluster 108 provides specialized processing capabilities for executing simulation models by including at least one workstation and/or multi-processor server. Each workstation and/or multi-processor server executes and/or is in communications with one or more analytic servers 112 that include simulation models for evaluating the financial instruments. According to the invention, each analytic server 112 can process only one task at a time and each analytic server 112 is also capable of working on multiple versions of software applications and on different versions of a simulation model.

System 100 also includes multiple file servers 110 that each includes storage media for storing a copy of the programming code and data used in the invention. File servers 110 also include a plurality of databases for storing data structures used in the inventive system. In a preferred embodiment of the invention, both the programming code and data are stored in a static state and multiple historical versions of the programming code and data are kept on file server 110. Various components of system 100 may access the programming code and data on file servers 110. As would be obvious to one skilled in the art, the programming code and data also may be stored on other storage media in other parts of LAN 102 and synchronization utilities may be used to ensure that the programming codes and data stored in various locations are consistent. In a preferred embodiment, each enterprise server 106 also includes a local copy of the programming code and synchronization utilities ensure that the programming code on file servers 110 and enterprise server 106 are consistent.

As is apparent to those of ordinary skill in the art, LAN 102 may be further configured with suitable hardware and software, such as mainframes, PCs, and Internet capability to perform the functions of the present invention.

The inventive system is specifically configured to receive a financial instrument valuation request for evaluating one or more financial instruments. LAN 102 processes the request against a selected simulation model and provides a result to the user. Thus, system 100 provides a common data and analytic model platform that allows the user, regardless of the application being used, to access and execute the necessary simulation model(s) required by a requesting application 104.

Each user application 104 serves as a front end to LAN 102 by enabling users to submit a financial instrument valuation request, invoke various services on LAN 102 and view result based on the request. As is apparent to one skilled in the art, user application 104 may be any application related to evaluating a financial instrument. For example, the user application 104 may be a transaction application for determining whether a dealer call for a particular financial instrument is reasonably priced. User application 104 may submit the valuation request in a security mode or a portfolio mode. In the security mode, user application 104 submits one task at a time and waits for the results. In the portfolio mode, user application 104 submits a set of tasks at one time. The system immediately returns control of user application 104 to the user and notifies the user when all tasks are completed. The system may preferably notify the user by e-mail, although it should be apparent that other notification means may be used. Enterprise server 106 monitors all valuation requests received by LAN 102, uses the request to determine the appropriate simulation model(s) to be executed, and distributes requests to one or more components in the system in order to efficiently use the network's resources. When more than one enterprise server 106 is implemented in the system, and one enterprise server 106 fails or is busy, another enterprise server 106 may take over and assume responsibilities for the distributed processing requirements of the system.

Figure 2:
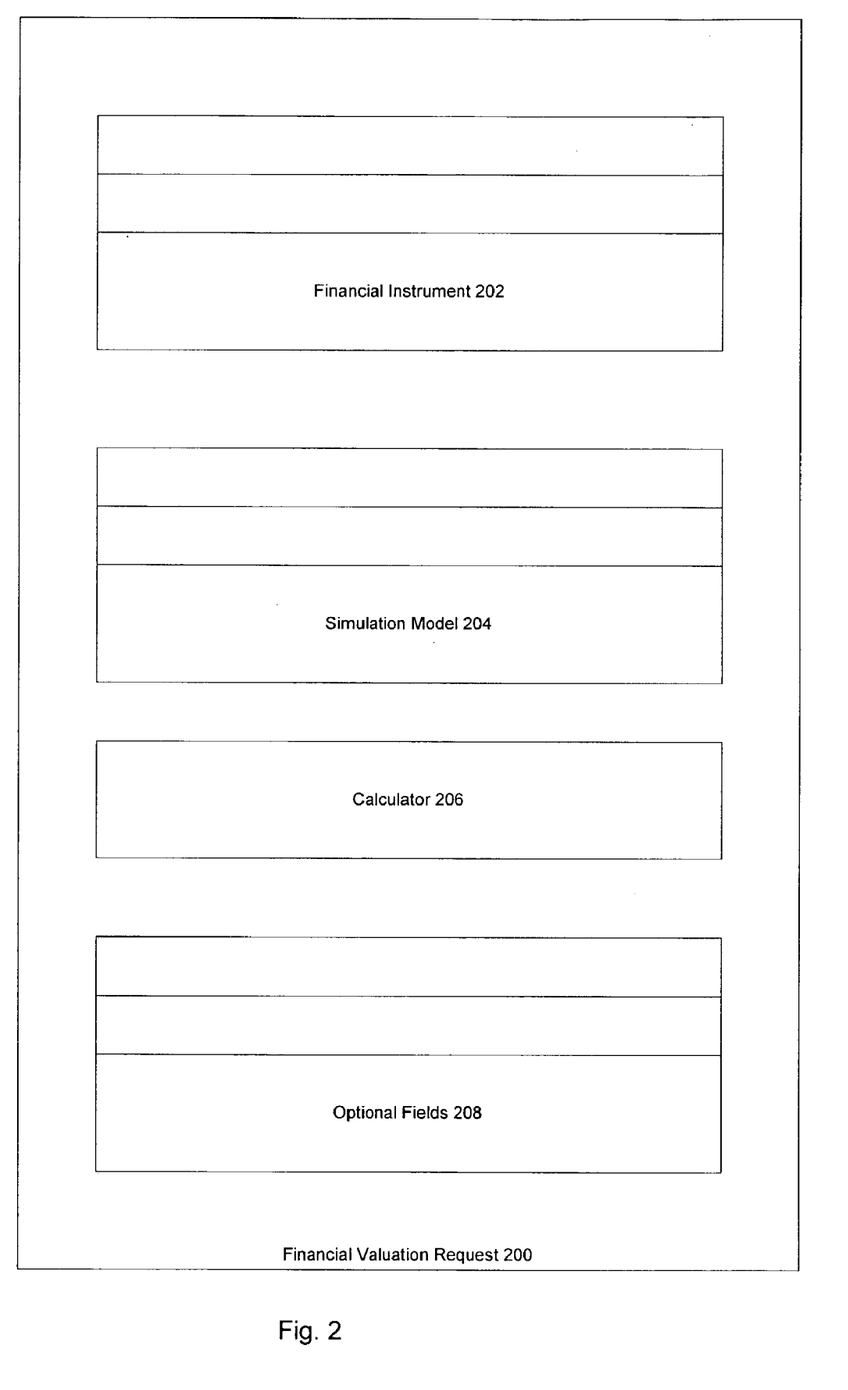
FIG. 2 illustrates a valuation request used in the inventive system.

FIG. 2 illustrates a valuation request used in the inventive system. The financial valuation request 200 is preferably submitted using eXtensible Markup Language (XML). As is obvious to one of ordinary skill in the art, other formats for the valuation request, such as Standard Generalized Markup Language (SGML), Hyper Text Markup Language (HTML), Wireless Markup Language (WML), may be used and are considered within the scope of the present invention. Financial valuation request 200 includes one or more financial instruments 202 to be evaluated, one or more simulation models 204 to be executed in order to evaluate the given financial instrument 202, and one or more calculators 206. Examples of financial instruments 202 that may be included in request 200 include bonds, stocks, mortgage portfolios, security portfolios, and/or a derivative securities. As is apparent to one skilled in the art, any financial instrument that is evaluated using a simulation model may be included in request 200. Simulation models 204 included in the financial valuation request simulates the affect on the cash flows provided by the financial instrument based on one or more economic parameters. Examples of simulation models include an interest rate model, a prepayment model, a loss-severity model, a finance rate model, a home price model, and a property valuation model. Financial valuation request 200 further includes calculator 206. Given the financial instrument and the result of the model execution, calculator 206 calculates the analytics, such as duration, on the cash flows at any point in time for the financial instrument.

Valuation request 200 may further include one or more optional information fields 208 for specifying information, such as the location of the simulation model to be used, and the priority of request 200, among others. For example, if the user is aware that a new model is available to the system, the user may specify the location of the model on the system. In this manner, the present invention is adapted to be a "plug and play" modeling system. The user may also specify, in the request, whether or not to aggregate results from the simulation model(s) and whether the results will be stored in a database. In a preferred embodiment, however, LAN 102 receives the valuation request from the user, determines the appropriate simulation model(s) to be executed, and distributes the tasks associated with the request and the associated processing requirements within the network according to parameters that allow for the most efficient use of the network. Thereafter, the appropriate model(s) are executed, the results are determined and then returned to the user. Valuation requests 200 may be real time or batch request and they are highly scalable, thereby enabling the reuse of the same resources.

Figure 3:
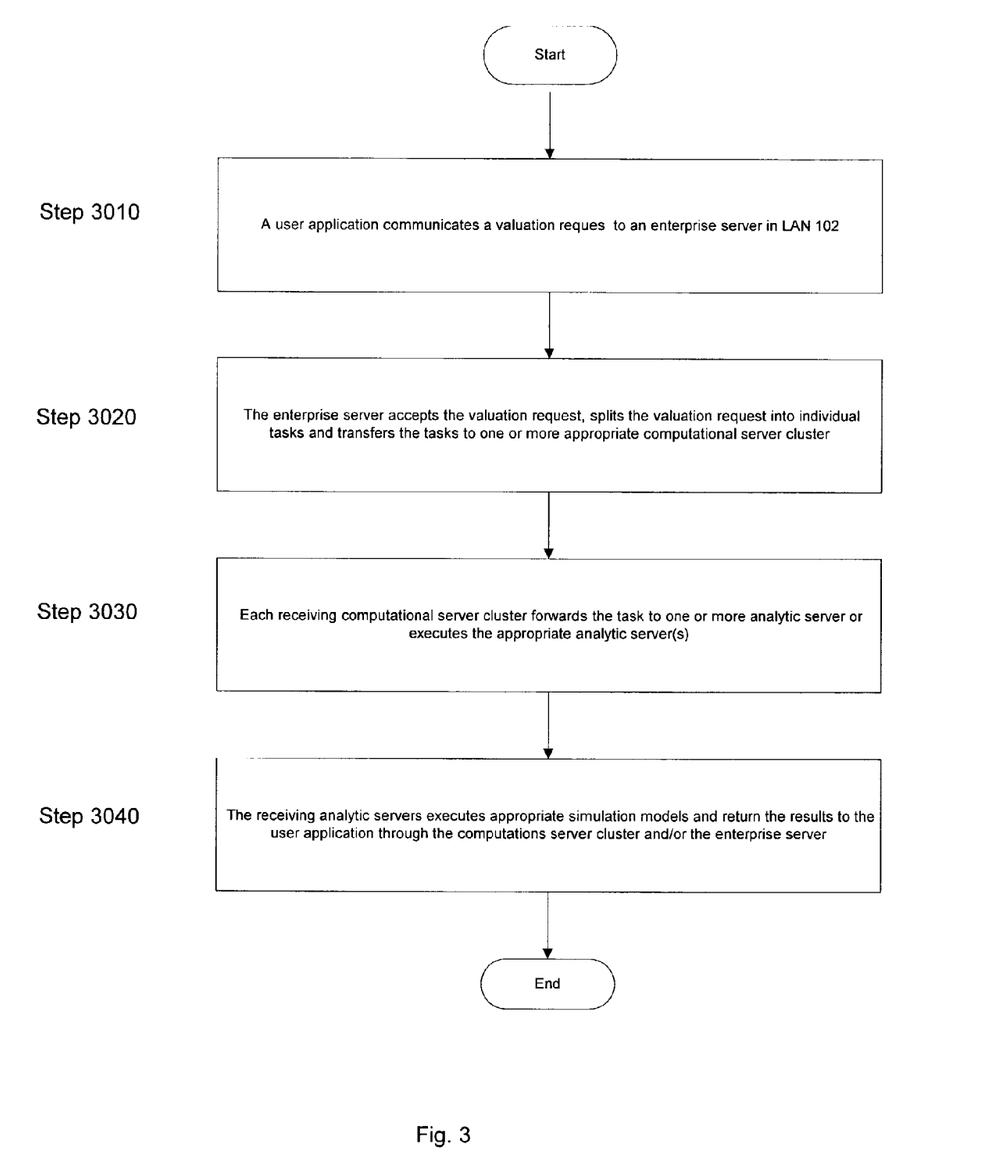
FIG. 3 illustrates the steps implemented in a preferred embodiment of the present invention.

FIG. 3 illustrates the steps implemented in a preferred embodiment of the present invention. In Step 3010, user application 104 communicates a valuation request 200 to enterprise server 106. In Step 3020, enterprise server 106 accepts valuation request 200, splits valuation request 200 into individual tasks and transfers the tasks to the appropriate computational server cluster 108. In Step 3030, the computational server cluster 108 receives the individual task from enterprise server 106 and forwards the task to the appropriate analytic server 112. If the request received from enterprise server 106 includes a request for valuation of a plurality of financial instruments, for example, a mortgage portfolio, computational server cluster 108 divides the request into sub-requests, and submits the different sub-requests to different analytic servers 112. In Step 3040, analytic servers 112 execute the appropriate simulation models and return the results to user application 104 through computations server cluster 108 and/or enterprise server 106.

Figure 4:
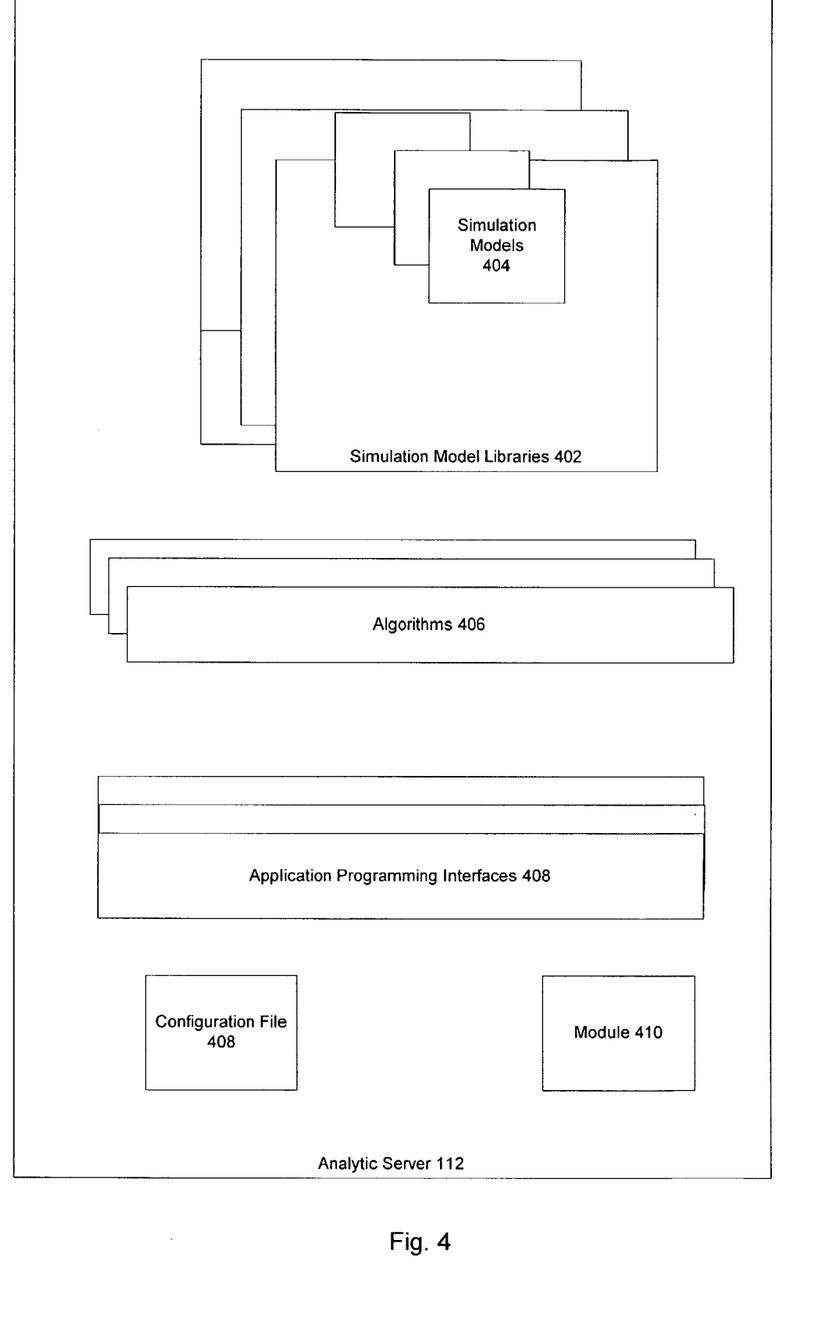
FIG. 4 illustrates the various components of each analytic server.

FIG. 4 illustrates the various components of each analytic server 112. Analytic server 112 includes one or more simulation model libraries 402 that store a plurality of simulation models 404, algorithms 406 for implementing the information in each simulation model library 402 and one or more application programming interfaces (API) 408. Simulation models 404 stored in model library 402 are preferably coded using the computer program language C++. Other computer programming languages, such as FORTRAN, are considered well within the scope of the present invention. As is apparent to those skilled in the art, API 408 includes functions and values that enable simulation models 404 to communicate with other components of system 100. Each analytic server is capable of accessing the information necessary to validate each request and accessing a configuration file 408 which defines the parameters for how each algorithm 406 is to be executed for each simulation model 404. As such, each server 112 is modifiable and it may be optimized by dynamically loading algorithm 406 when a request is received.

Specifically, upon receiving each a request, each analytic server 112 includes a module 410 for parsing the request from user application into at least one algorithm 406. Analytic server 112 also determines the dependence between different calculations to be implemented in the request and parses the request into optimal calculations by caching previous calculation in the requests and dynamically reviewing the results from the previous calculations to determine optimal manner for executing each upcoming calculation. Thereafter, analytic server 112 executes each calculation in the request in the most optimal manner. Depending on the request, analytic server 112 may substitute results from calculations into the original request and send back the substitution to the requesting application. Based on the request, each analytic server 112 is able to store the results in at least one database.

Figure 5:
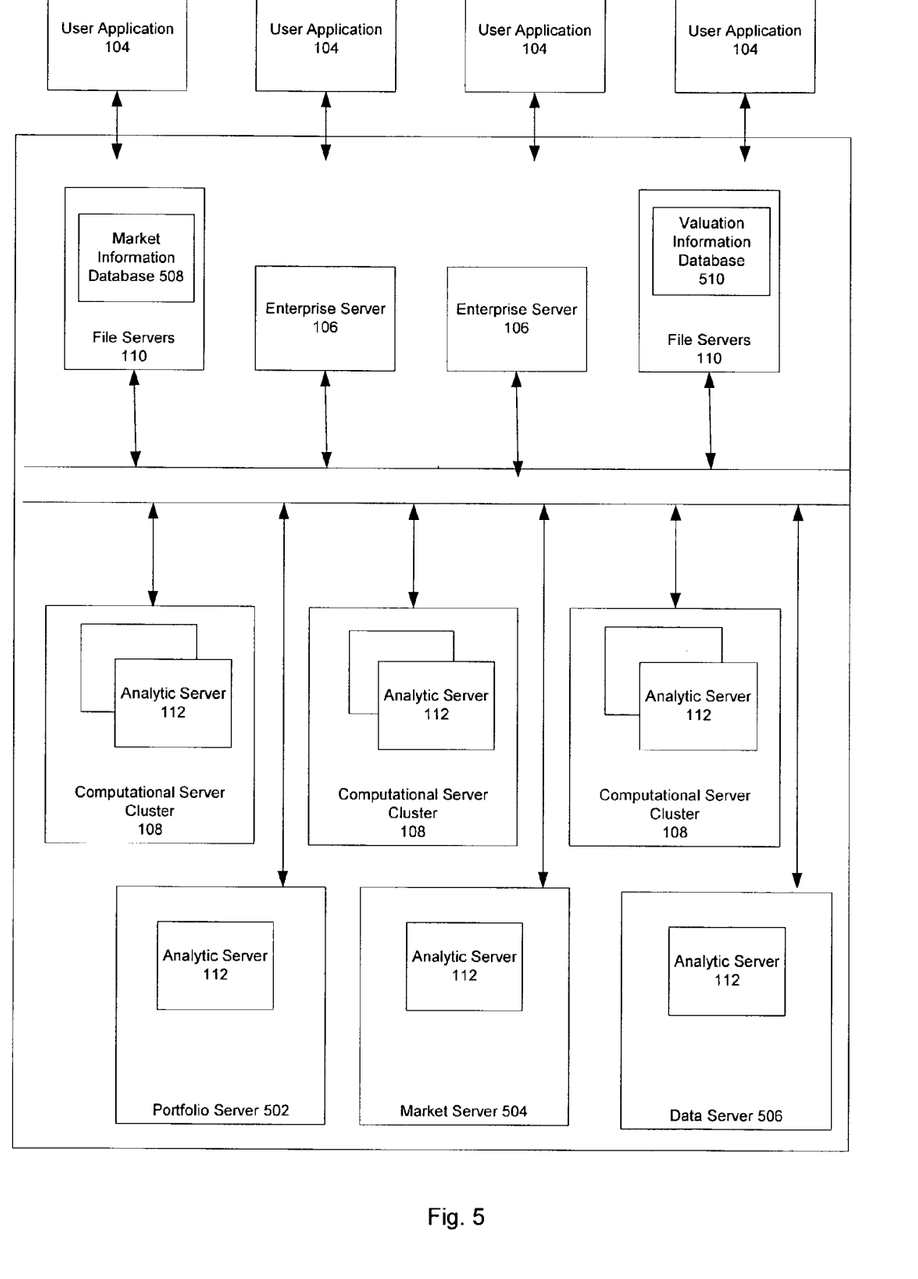
FIG. 5 illustrates an embodiment of present invention that includes specialized servers.

FIG. 5 illustrates an embodiment of present invention that includes specialized servers. FIG. 500 include one or more portfolio servers 502, one or more market servers 504, and one or more data servers 506. Portfolio server 502 preferably is in communication with an analytic server 112. Market server 504 preferably is in communication with market information database 508 in file servers 110 and data server 506 preferably is in communication with valuation information database 510 in file servers 110.

Market server 504 extracts market data from market information database 508 in file servers 110 to be used during execution of the simulation model(s). Market information database 508 stores information, historical data, and factual data related to financial markets, such as but not limited to, the interest rate and stock prices. Therefore, the market server may be used to provide a real-time snapshot of a particular market or a virtual snapshot of a market based on modified information. Data server 506 is in communication with valuation information database 510 in file server 110. Valuation information database 510 stores financial instrument valuation requests 200, valuation results, and analytical model calculations. For example, valuation information database 510 may store two different sets of results from a particular analytical model and associated input values. Data server 504 may further be used to generate new requests 200 and populate valuation database 510 with new results. Thus, data server 506 is adapted to generate useful valuation information and allow for testing by monitoring how results change using different input parameters and models. As is obvious to one skilled in the art, other specialized servers and/or databases may be included in the invention.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A distributed system that provides a common data and analytic model platform for enabling users of different applications to evaluate at least one financial instrument by accessing and executing at least one simulation model, the system comprising:

at least one user application in communication with a network;

the network comprising a plurality of components for accepting a plurality of requests for execution against different simulation models from the user application, each request, from the plurality of requests, including a financial instrument, a simulation model relating to the financial instrument, and a calculator:

at least one of the plurality of components for executing each request against the appropriate simulation model by executing an analytic server that includes the simulation model for evaluating the financial instrument and returning associated results from the simulation model to the user application, the simulation model being one of an interest rate model, a pre-payment model, loss severity model, finance rate model, a home price model, and a property valuation model, wherein the plurality of components includes at least one enterprise server for receiving requests from the user application such that the enterprise server is a high availability server responsible for splitting up requests into independent tasks and at least one computational server cluster for accepting tasks from the enterprise server and providing specialized processing capabilities for executing simulation models such that the computational server cluster includes the analytic server, wherein the analytic server including a parser that parses the request to determine the dependence between different calculations implemented on the request and parses the request into optimal calculations and a cache memory into which the parser stores previous calculations from the requests and dynamically reviews the results from the previous calculations to determine an optimal manner for executing each future calculation by substituting results from the calculations into the original request; and at least one file server that includes storage media for storing a copy of the programming code and data used in the system.

2. The system of claim 1, wherein the computational server cluster comprises at least one specialized computing component in communications with the analytic server for evaluating the financial instruments.

3. The system of claim 1, wherein the programming code and data are stored in the file server in a static state.

4. The system of claim 1, wherein multiple historical versions on the programming code and data are stored in the file server.

5. The system of claim 1, wherein the enterprise server includes a local copy of the programming code and synchronization utilities ensures that the programming code on the file server and the enterprise server.

6. The system of claim 1, wherein the enterprise server receives an evaluation request from the user application, uses the evaluation request to determine the appropriate simulation model to be executed, and efficiently distributes the evaluation request and the associated processing requirements within the network.

7. The system of claim 1, wherein the user application is any application related to evaluating a mortgage portfolio.

8. The system of claim 1, wherein the plurality of components comprise:

a plurality of enterprise server for receiving requests from the user application, wherein each enterprise server is a high availability server responsible for splitting up requests into independent tasks and at least one load balancer is used to distribute requests between the plurality of enterprise servers;

at least one computational server cluster for accepting tasks from the enterprise server and providing specialized processing capabilities for executing simulation models, wherein the computational server cluster includes the analytic server; and at least one file server that includes storage media for storing a copy of the programming code and data used in the system.

9. The system of claim 8, wherein if one of the plurality of enterprise servers fails, the load balancer redirects the requests to another one of the plurality of enterprise servers.

10. The system of claim 1, wherein each request is submitted to the network using text request.

11. The system of claim 1, wherein the financial instrument is a mortgage portfolio.

12. The system of claim 1, further comprising at least one optional field for submitting optional information to the network.

13. The system of claim 1, wherein the analytic server comprises:

at least one simulation library for storing a plurality of simulation models;

at least one configuration file which defines the parameters for how the at least one simulation algorithm implements the request against the simulation library; and at least one application interface for enabling the plurality of simulation models to communicate with components in the system.

14. A method for enabling users of different applications to evaluate financial instruments by accessing and executing at least one simulation model in a distributed computer network, the method comprising the steps of communicating a valuation request from at least one user application to a network;

accepting the valuation request from the user application by the network, the valuation request including a financial instrument, a simulation model, and a calculator;

dividing the valuation request into tasks, identifying the dependencies among the different tasks; transferring the tasks to at least one component in communications with an appropriate simulation model;

executing each task against the appropriate simulation model by an analytic server, one task at a time;

caching each task result of executed tasks;

substituting task results from prior executed tasks in place of executing similar tasks;

returning results from the simulation model to the user application;

receiving requests from the user application by an enterprise server, wherein the enterprise server is a high availability server responsible for splitting up requests into independent tasks;

accepting tasks from the enterprise server by at least one computational server cluster to provide specialized processing capabilities for executing simulation models, wherein the computational server cluster includes the analytic server;

parsing the request by the analytic server to determine the dependence between different calculations implemented on the request and parsing the request into optimal calculations, storing previous calculations from the requests in a cache memory, and dynamically reviewing the results from the previous calculations to determine an optimal manner for executing each future calculation by substituting results from the calculations into the original request; and storing a copy of the programming code and data used in the system by at least one file server.

15. The method of claim 14, wherein the valuation request comprises a plurality of financial instruments and the step of accepting further comprises the step of dividing the valuation request into sub requests.

16. A computer-readable medium whose contents cause a computer system to enable users of different applications to evaluate financial instruments by accessing and executing at least one simulation model in a distributed computer network, by performing the steps of:

communicating a valuation request from at least one user application to a network;

accepting the valuation request from the user application by the network, the valuation request comprising a plurality financial instrument, at least one simulation model, and at least one calculator;

determining the plurality of financial instruments comprising the valuation request and dividing the valuation request into sub requests;

dividing the valuation request and sub-requests into tasks;

transferring the tasks to at least one component in communications with an appropriate simulation model corresponding to at least one simulation model, the simulation model including one of an interest rate model, a pre-payment model, loss severity model, finance rate model, a home price model, and a property valuation model;

executing each task against the appropriate simulation model by an analytic server, wherein each analytic server processes one task at a time; and returning results from the simulation model to the user application;

receiving requests from the user application by an enterprise server, wherein the enterprise server is a high availability server responsible for splitting up requests into independent tasks;

accepting tasks from the enterprise server by at least one computational server cluster to provide specialized processing capabilities for executing simulation models, wherein the computational server cluster includes the analytic server;

parsing the request by the analytic server to determine the dependence between different calculations implemented on the request and parsing the request into optimal calculations, storing previous calculations from the requests in a cache memory and dynamically reviewing the results from the previous calculations to determine an optimal manner for executing each future calculation by substituting results from the calculations into the original request; and storing a copy of the programming code and data used in the system by at least one file server.

17. A method for enabling users of different applications to evaluate financial instruments by accessing and executing at least one simulation model in a distributed computer network, the method comprising the steps of:

communicating a valuation request from at least one user application to a network, the valuation request comprising a plurality financial instrument, at least one simulation model, and at least one calculator;

accepting the valuation request from the user application by the network;

dividing the valuation request into tasks;

transferring the tasks to at least one component in communications with an appropriate simulation model;

executing each task against the appropriate simulation model by analytic server, wherein each analytic server parses the request into at least one algorithm, accesses a configuration file for defining the parameter of how the at least one algorithm is to be executed, determines the dependence between different calculations to be implemented in the request, parses the request into optimal calculations by caching previous calculations in the request and dynamically reviewing the results from the previous calculations to determine an optimal manner for executing each upcoming calculation and processes one task at a time, and returning results from the simulation model to the user application;

wherein the simulation model including one of an interest rate model, a pre-payment model, loss severity model, finance rate model, a home price model, and a property valuation model.

18. A distributed system that provides a common data and analytic model platform for enabling users of different applications to evaluate at least one financial instrument by accessing and executing at least one simulation model, the system comprising:

at least one user application in communication with a network; and the network comprising:

at least one enterprise server for receiving requests from the user application and for executing the request against different simulation models, the request comprising a plurality financial instrument, at least one simulation model, and at least one calculator, and the enterprise server being a high availability server responsible for splitting up requests into independent tasks;

at least one computational server cluster for accepting tasks from the enterprise server and providing specialized processing capabilities for executing simulation models, wherein the computational server cluster includes the analytic server that executes each request against an appropriate simulation model that evaluates a financial instrument in the request and returns associated results from the simulation model to the user application, the simulation model including one of an interest rate model, a pre-payment model, loss severity model, finance rate model, a home price model, and a property valuation model;

the analytic server including a parser that parses the request to determine the dependence between different calculations implemented on the request and parses the request into optimal calculations and a cache memory into which the parser stores previous calculations from the requests and dynamically reviews the results from the previous calculations to determine an optimal manner for executing each future calculation by substituting results from the calculations into the original request; and at least one file server that includes storage media for storing a copy of the programming code and data used in the system.

* * * * *